US010425467B1

(12) United States Patent
Buijsman et al.

(10) Patent No.: US 10,425,467 B1
(45) Date of Patent: Sep. 24, 2019

(54) COMPUTER-IMPLEMENTED METHOD AND SYSTEM FOR COMMUNICATION OF AUDIO DATA FILES

(71) Applicant: POQEAPP B.V., Hillegom (NL)

(72) Inventors: Petrus Johannes Buijsman, Hillegom (NL); Ruud Van Den Hooff, Hillegom (NL)

(73) Assignee: POQEAPP B.V. (NL)

( * ) Notice: Subject to any disclaimer, the term of this patent is extended or adjusted under 35 U.S.C. 154(b) by 0 days.

(21) Appl. No.: 16/262,839

(22) Filed: Jan. 30, 2019

(30) Foreign Application Priority Data

Aug. 10, 2018 (NL) ...................................... 2021453

(51) Int. Cl.
*H04L 29/08* (2006.01)
*G06F 3/16* (2006.01)
*G06F 3/0484* (2013.01)

(52) U.S. Cl.
CPC .............. *H04L 67/06* (2013.01); *G06F 3/165* (2013.01); *G06F 3/0484* (2013.01)

(58) Field of Classification Search
CPC .... G06F 1/1626; G06F 21/36; G06F 3/04883; G06F 3/04886; G06F 3/165; G06F 3/0484; G06T 13/40; G10L 21/00; H04L 51/10; H04L 67/06; H04M 3/42263; H04N 21/43637; H04W 12/06; H04W 12/08; H04W 4/44
See application file for complete search history.

(56) References Cited

U.S. PATENT DOCUMENTS

| 9,292,310 B2 | 3/2016 | Chaudhri et al. ..... G06F 9/4443 |
| 9,602,985 B2 | 3/2017 | Koum et al. ............ H04W 4/12 |
| 2007/0036292 A1 | 2/2007 | Selbie et al. ........... H04M 11/00 |

(Continued)

OTHER PUBLICATIONS

Amelio Vazquez-Reina, "Playing WhatsApp audio messages after locking the screen," Sep. 29, 2015, https://apple.stackexchange.com/questions/207984/playing-whatsapp-audio-messages-after-locking-the-screen, dated Sep. 29, 2015.

(Continued)

*Primary Examiner* — Le H Luu
(74) *Attorney, Agent, or Firm* — Hayes Soloway P.C.

(57) ABSTRACT

Disclosed is a computer-implemented method, a computer readable medium, a computer program product and a communication system for communication between a first electronic device and a second electronic device, wherein the method includes the steps of:
a) starting and completing a first audio recording at the first electronic device;
b) transmitting the completed first audio recording from the first electronic device towards the second electronic device; and
c) receiving the completed first audio recording at the second electronic device;
wherein the second electronic device has an unlocked mode and a locked mode, wherein the locked mode has reduced functionality compared to the unlocked mode and requires user interaction to access the unlocked mode;
wherein the method further includes the step of:
d) playing the completed first audio recording automatically at the second electronic device when the second electronic device is in the locked mode.

20 Claims, 11 Drawing Sheets

(56) References Cited

U.S. PATENT DOCUMENTS

| | | | |
|---|---|---|---|
| 2007/0103454 A1* | 5/2007 | Elias | G06F 1/1626 |
| | | | 345/173 |
| 2010/0060586 A1* | 3/2010 | Pisula | G06F 3/04886 |
| | | | 345/169 |
| 2015/0040029 A1 | 2/2015 | Koum et al. | H04L 51/36 |
| 2016/0157068 A1* | 6/2016 | Koum | H04L 51/10 |
| | | | 455/412.2 |
| 2016/0165452 A1* | 6/2016 | Garcia | H04W 12/08 |
| | | | 455/411 |
| 2017/0357439 A1* | 12/2017 | Lemay | G06F 3/04883 |
| 2018/0077626 A1* | 3/2018 | Wilson, Jr. | H04W 4/44 |
| 2018/0088896 A1* | 3/2018 | Olson | G06F 3/165 |
| 2018/0131683 A1* | 5/2018 | Woodward | H04W 12/06 |
| 2018/0234549 A1* | 8/2018 | Coffman | H04M 3/42263 |
| 2018/0260993 A1* | 9/2018 | Thumm | G06T 13/40 |
| 2018/0314815 A1* | 11/2018 | Bowler, II | G06F 21/36 |
| 2018/0329585 A1* | 11/2018 | Carrigan | H04N 21/43637 |
| 2018/0335312 A1* | 11/2018 | Bennett | G10L 21/00 |

OTHER PUBLICATIONS

Seach Report issued in co-pending Dutch Patent Application Serial No. 2021453, dated Mar. 22, 2019 (17 pages).

\* cited by examiner

COMPUTER-IMPLEMENTED METHOD AND SYSTEM FOR COMMUNICATION OF AUDIO DATA FILES

BACKGROUND

The invention relates to a computer-implemented method, a computer readable medium, a computer program product and a communication system for communication between a first electronic device and a second electronic device.

U.S. Pat. No. 9,602,985 B2 discloses a system, graphical user interface and method for conducting electronic voice communications with status notifications. A user of a first portable device executing a communication application selects a multi-function control that automatically initiates an audio recording, which is automatically sent toward another participant of an active communication session when the control is released. In some implementations, the recording may be downloaded automatically if/when the device is online. In other implementations, the operator of the device may be notified that the recording is available, and must take action to download it. When the recording is downloaded to the device, a control for initiating its playback is inserted into the conversation. Thus, the user of the device can commence playback by pressing one icon or control.

SUMMARY OF THE INVENTION

A disadvantage of the known electronic voice communications as disclosed in U.S. Pat. No. 9,602,985 B2 is that the incoming audio recording is not played automatically. In particular, user interaction is required to initiate playback of the audio recording. In some cases however, it may important that the audio recording is heard, e.g. when the audio recording is time-critical or has another priority that may not be ignored.

Other applications, such as Push-To-Talk (PTT) applications, have been created for use on smart devices, such as smart phones, for setting up a direct connection between two smart devices to enable real-time communication. These PTT applications are similar to a conventional walkie-talkie system. However, they typically do not record and store the real-time communication and represent them chronologically in a graphical user interface to enable playback. Moreover, the PTT applications require both smart devices to be unlocked. When one of the smart devices is locked, the connection will fail and the attempt will simply be registered as a missed call.

Hence, in U.S. Pat. No. 9,602,985 B2 the audio recording is not played automatically and in the known PTT applications, audio is not recorded to enable playback and it may be difficult to connect when one of the devices is locked. Consequently, there is a need to improve the known electronic audio communication.

It is an object of the present invention to provide a computer-implemented method, a computer readable medium, a computer program product and a communication system for communication between a first electronic device and a second electronic device, wherein the communication can be improved.

According to a first aspect, the invention provides a computer-implemented method for communication between a first electronic device and a second electronic device, wherein the method comprises the steps of:

a) starting and completing a first audio recording at the first electronic device;

b) transmitting the completed first audio recording from the first electronic device towards the second electronic device; and c) receiving the completed first audio recording at the second electronic device;

wherein the second electronic device has an unlocked mode and a locked mode, wherein the locked mode has reduced functionality compared to the unlocked mode and requires user interaction to access the unlocked mode;

wherein the method further comprises the step of:

d) playing the completed first audio recording automatically at the second electronic device when said second electronic device is in the locked mode.

With the aforementioned steps of the method, an audio-based messaging platform can be provided for communication between electronic devices, wherein the communication can be more direct. Moreover, the directness of the automatically played audio recordings can create a sense of urgency or priority that can be useful in certain situations.

In a preferred embodiment the second electronic device comprises a display, a processor and a computer program product with instructions that, when executed by said processor, generate a user interface that allows for user-initiated playback of the completed first audio recording, wherein the processor is arranged for displaying the user interface in a foreground mode on the display and for hiding the user interface from the display in a background mode, wherein the method further comprises the step of playing the completed first audio recording automatically at the second electronic device when the user interface is hidden from the display in the background mode. Consequently, the automatic playback of the audio recordings not only functions when the second electronic device is in the locked mode, but also when said second electronic device is in the unlocked mode and the user interface of the computer program product operates in the background mode, e.g. when the user of the second electronic device is actively using the second electronic device, yet for a different purpose.

In a further embodiment thereof the method further comprises the step of playing the completed first audio recording automatically at the second electronic device when the user interface is displayed on the display in the foreground mode. This simplifies the situation in which the user of the second electronic device is actively using the user interface to engage in the conversation with the user of the first electronic device. In particular, the incoming audio recordings can be played without user intervention by the user of the second electronic device, e.g. without the need to press a playback button.

Preferably, step d) comprises the steps of playing a silent audio sample on the second electronic device in the unlocked mode, continuing to play the silent audio sample on the second electronic device when the second electronic device enters the locked mode and playing the completed first audio recording instead of or in addition to the silent audio sample in the locked mode. Continuously playing silent audio sample as the second electronic device enters the locked mode can prevent that permissions for using the speaker of the second electronic device have to be obtained during the locked mode, which is typically not allowed.

In another preferred embodiment, step b) comprises the steps of transmitting the completed first audio recording to a payload server and sending a push message to a notification server, wherein step c) comprises the steps of receiving the push message from the notification server and retrieving the first audio recording from the payload server. In particular, the steps of step c) are performed when the second electronic device is in the locked mode. The retrieval of the first audio recording can thus be triggered from the locked mode of the second electronic device by using the push message as the trigger.

In another embodiment the method further comprises the step of providing a block option at the second electronic device to switch off the automatic playing in step d). Preferably, the method further comprises the step of providing a notification at the second electronic device that the completed first audio recording has been received. The block option can prevent that the audio recordings play automatically against the will of the user of the second electronic device. The notification still ensures that the user of the second electronic device is made aware of the arrival of the audio recordings.

In another embodiment the method further comprises the step of setting one or more time windows at the second electronic device, wherein either inside or outside of the one or more time windows the second electronic device requires user interaction to play the completed first audio recording. The time windows can prevent that the audio recordings play automatically during a period which is inconvenient for the user of the second electronic device, e.g. during the night. The time windows can be set as general time windows or user/group specific time windows.

In another embodiment the method further comprises the steps of:

e) providing one or more predefined response options at the second electronic device for responding to the completed first audio recording;

f) receiving a user input at the second electronic device opting for one of the one more response options; and g) transmitting a notification indicative of the opted response option from the second electronic device to the first electronic device. Consequently, when a closed question is received, the user of the second electronic device does not necessarily have to record a response. Instead, the user of the second electronic device may simply choose a predefined response which can then automatically be send to the user of the first electronic device.

In another embodiment the method further comprises the steps of:

h) transmitting an availability request from the first electronic device towards the second electronic device;

i) receiving the availability request at the second electronic device;

j) providing one or more predefined response options at the second electronic device for responding to the availability request;

k) receiving a user input at the second electronic device opting for one of the one or more response options; and l) transmitting a notification indicative of the chosen response option from the second electronic device back to the first electronic device. Preferably, one of the one or more response options is an unavailability response option indicating that the user of the second electronic device is unavailable or temporarily unavailable. By using the availability request, the user of the first electronic device can get feedback from the user of the second electronic device on the availability to receive automatically played audio recordings and assess the appropriateness of sending said automatically played audio recordings.

In another embodiment the method further comprises the steps of:

m) creating a group at the first electronic device comprising the first electronic device, the second electronic device and one or more further electronic devices;

n) transmitting the completed first audio recording from the first electronic device towards the other electronic devices of the group; and o) receiving the completed first audio recording at the other electronic devices of the group. The groups allow one user to transmit a single audio recording to several contacts simultaneously. This may be useful in particular situations, e.g. in an office situation when the user of the first electronic device proposes to get coffee for the other contacts in the group and the other users can respond immediately.

Based on the previous embodiment, the method preferably further comprises the steps of:

p) starting and completing a second audio recording at one of the one or more further electronic devices of the group;

q) transmitting the completed second audio recording from the one further electronic device towards the other electronic devices of the group;

r) receiving the completed second audio recording at the second electronic device;

s) scheduling the completed first audio recording and the completed second audio recording such that the completed first audio recording and the completed second audio recording are not played simultaneously at the second electronic device. Hence, it can be prevented that the automatic playback of the first audio recording and the second audio recording overlap.

More preferably, the completed first audio recording and the completed second audio recording are scheduled in a scheduling order based on a start time, a completion time, a transmission time, a receiving time and/or a length of the audio recording. By using the start time to order the audio recordings, the chronological order of the audio recordings can be preserved. By using the completion time, the first completed audio recording can be played first. By using the transmission time or the receiving time, the audio recording first received at the server or at the second electronic device can be played first. By taking into account the length of the audio recording, priority can be given to shorter recordings over longer recordings.

In another embodiment the completed first audio recording is transmitted automatically after completion of the first audio recording in step b). Hence, the user of the first electronic device does not have to interact with the first electronic device after completion of the first audio recording. In particular, the user can simply press and hold a record button to record. The release of the record button completes the recording and automatically triggers the transmission.

In another embodiment the completed first audio recording comprises a voice recording. Hence, the communication method is a voice-based communication method.

In another embodiment the first audio recording has an input gain, wherein the second electronic device has an output volume that is adjustable within a volume range, wherein the method further comprises the steps of increasing the input gain when the output volume of the second electronic device is at a lower end of the volume range and decreasing the input gain when the output volume of the second electronic device is at a high end of the volume range.

According to a second aspect, the invention provides a computer readable medium comprising instructions that, when executed by a processor of an electronic device, cause said electronic device to alternately operate as the first electronic device and the second electronic device and execute the steps of the method according to any one of the aforementioned embodiments related to said first electronic device and the second electronic device, respectively. The computer readable medium can be data stream, a data package or a physical data carrier for loading the computer program product onto the electronic devices.

According to a third aspect, the invention provides a computer program product for communication between electronic devices, wherein the computer program product comprises instructions that, when executed by a processor of one of the electronic devices, cause said one electronic device to alternately operate as the first electronic device and the second electronic device and execute the steps of the method according to any one of embodiments of the method related to said first electronic device and the second electronic device, respectively. The computer program product can be a software program, such as an 'app', which can be loaded onto an electronic device and use its software and hardware resources.

According to a fourth aspect, the invention provides a communication system comprising a first electronic device, a second electronic device and a computer program product, wherein the second electronic device has an unlocked mode and a locked mode, wherein the locked mode has reduced functionality compared to the unlocked mode and requires user interaction to access the unlocked mode, wherein the computer program product comprises instructions that, when executed by processors of the first electronic device and the second electronic device, cause said first electronic device and said second electronic device to execute the steps of the method according to any one of the embodiments of the method related to said first electronic device and the second electronic device, respectively. The communication system can provide the hardware components, such as the electronic device and the servers, to execute the steps of the methods based on the instructions from the computer program product.

In a preferred embodiment, the communication system further comprises a notification server and a payload server, wherein the instructions, when executed by the processor of the first electronic device, cause said first electronic device to transmit the completed first audio recording to the payload server and sending a push message to the notification server, wherein the instructions, when executed by the processor of the second electronic device, cause said second electronic device to receive the push message from the notification server and retrieve the completed first audio recording from the payload server. The retrieval of the first audio recording can thus be triggered from the locked mode of the second electronic device by using the push message as the trigger.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
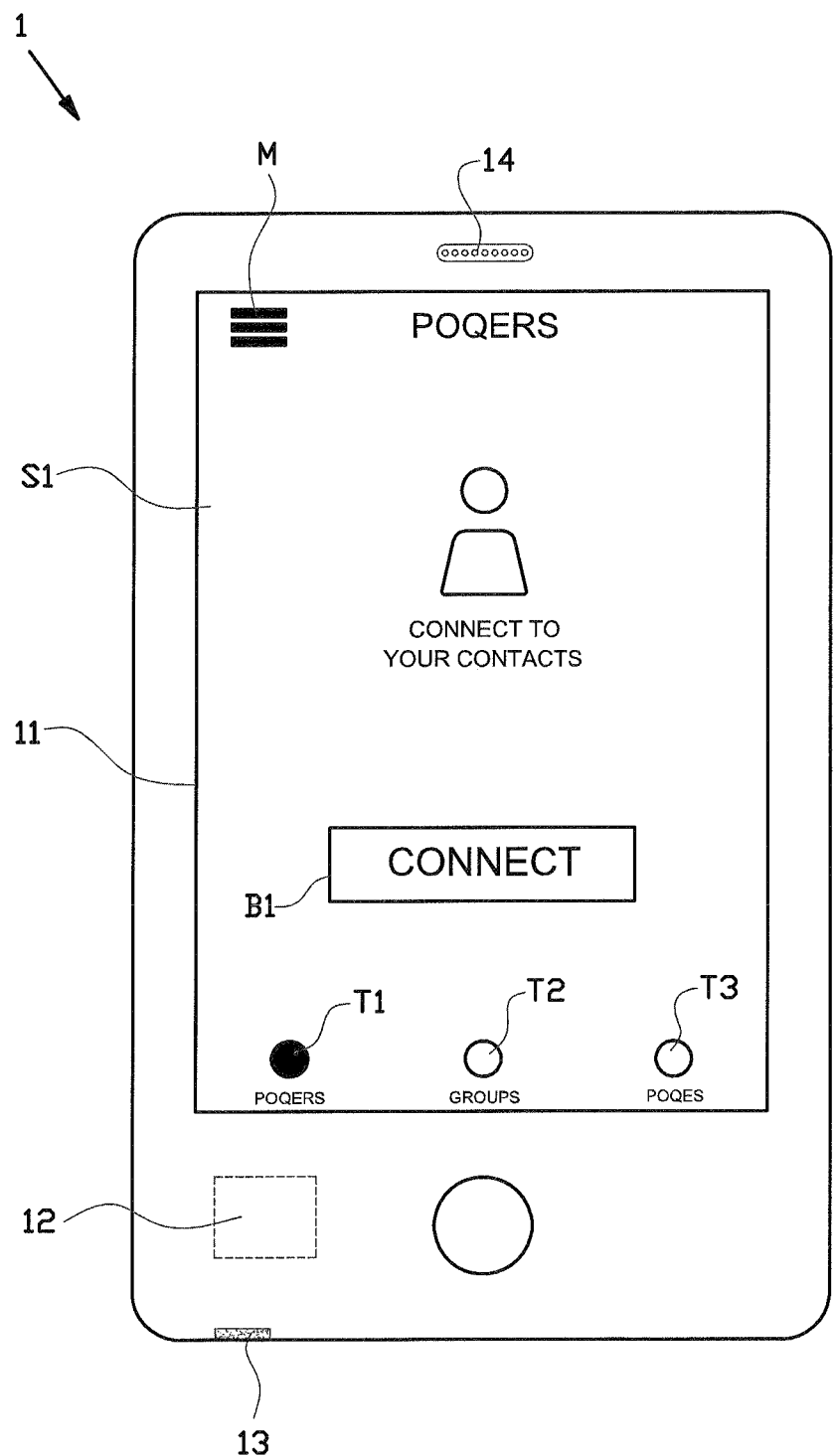
FIG. 1 shows a contact screen of a user interface displayed on a first electronic device which allows the user to connect to contacts.
Figure 2:
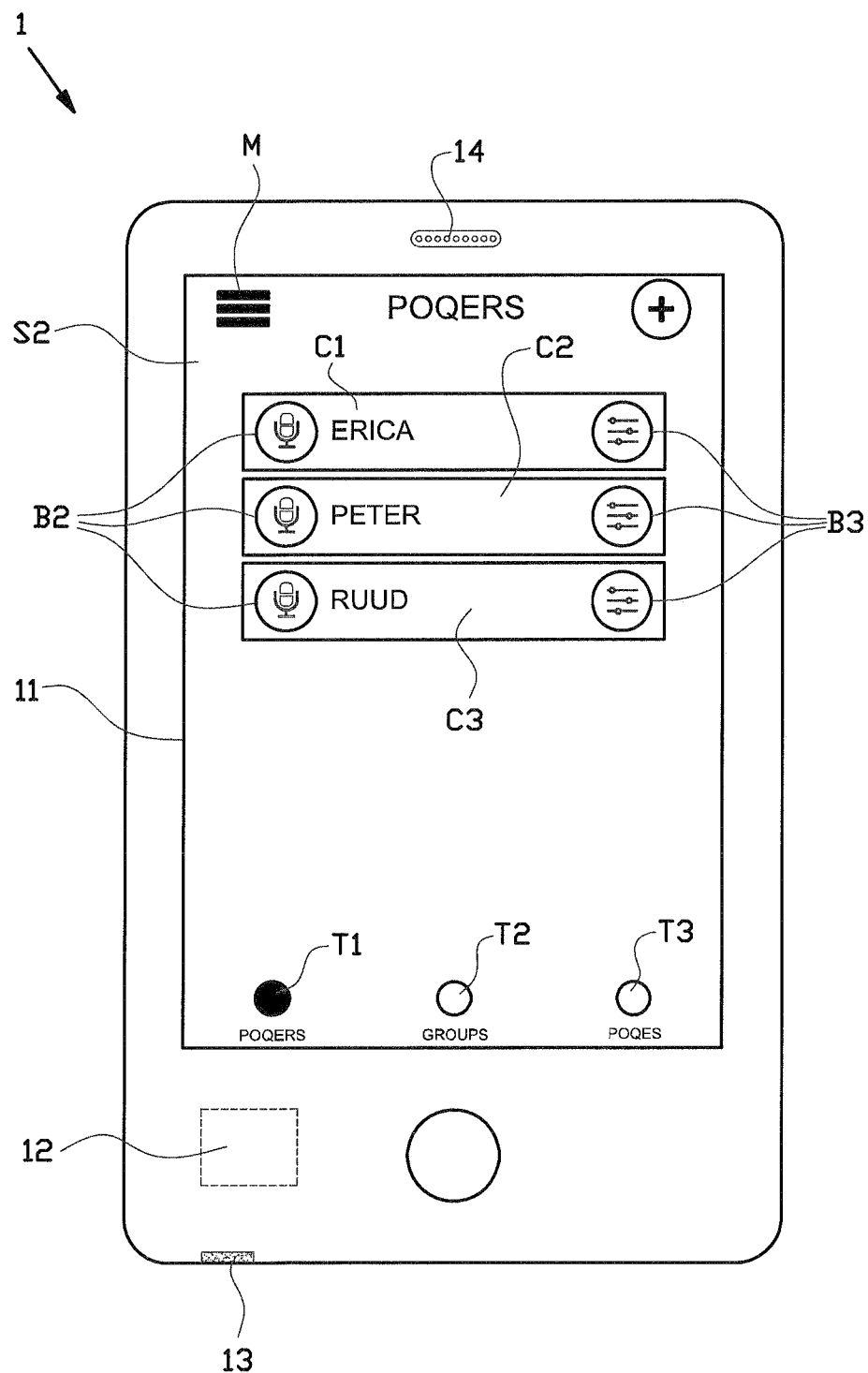
FIG. 2 shows a contact list screen of the user interface of FIG. 1 which allows the user to record an audio recording for a specific contact.
Figure 3:
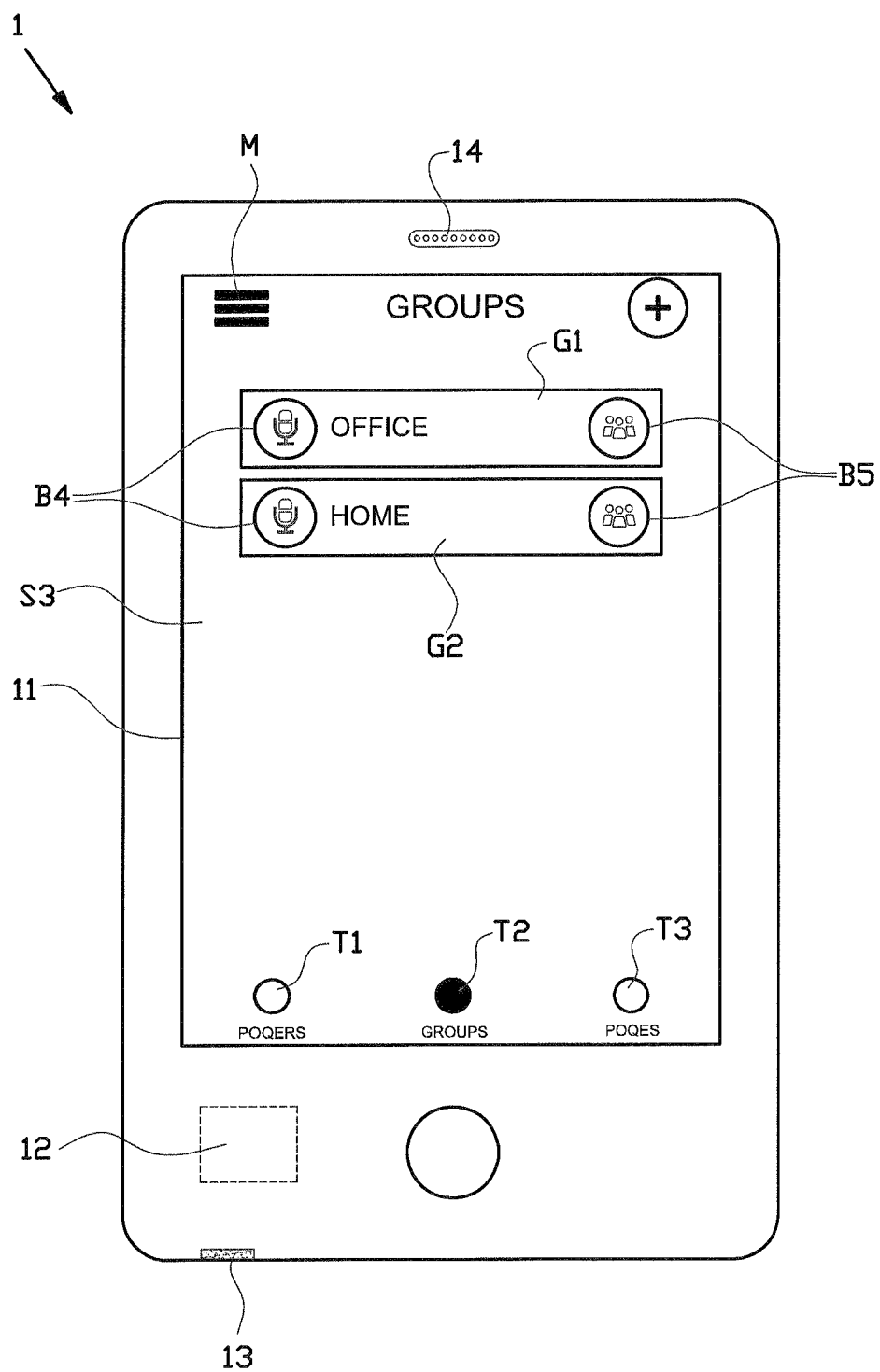
FIG. 3 shows a group list screen of the user interface of FIG. 1 which allows the user to record an audio recording for a group of contacts.
Figure 8:
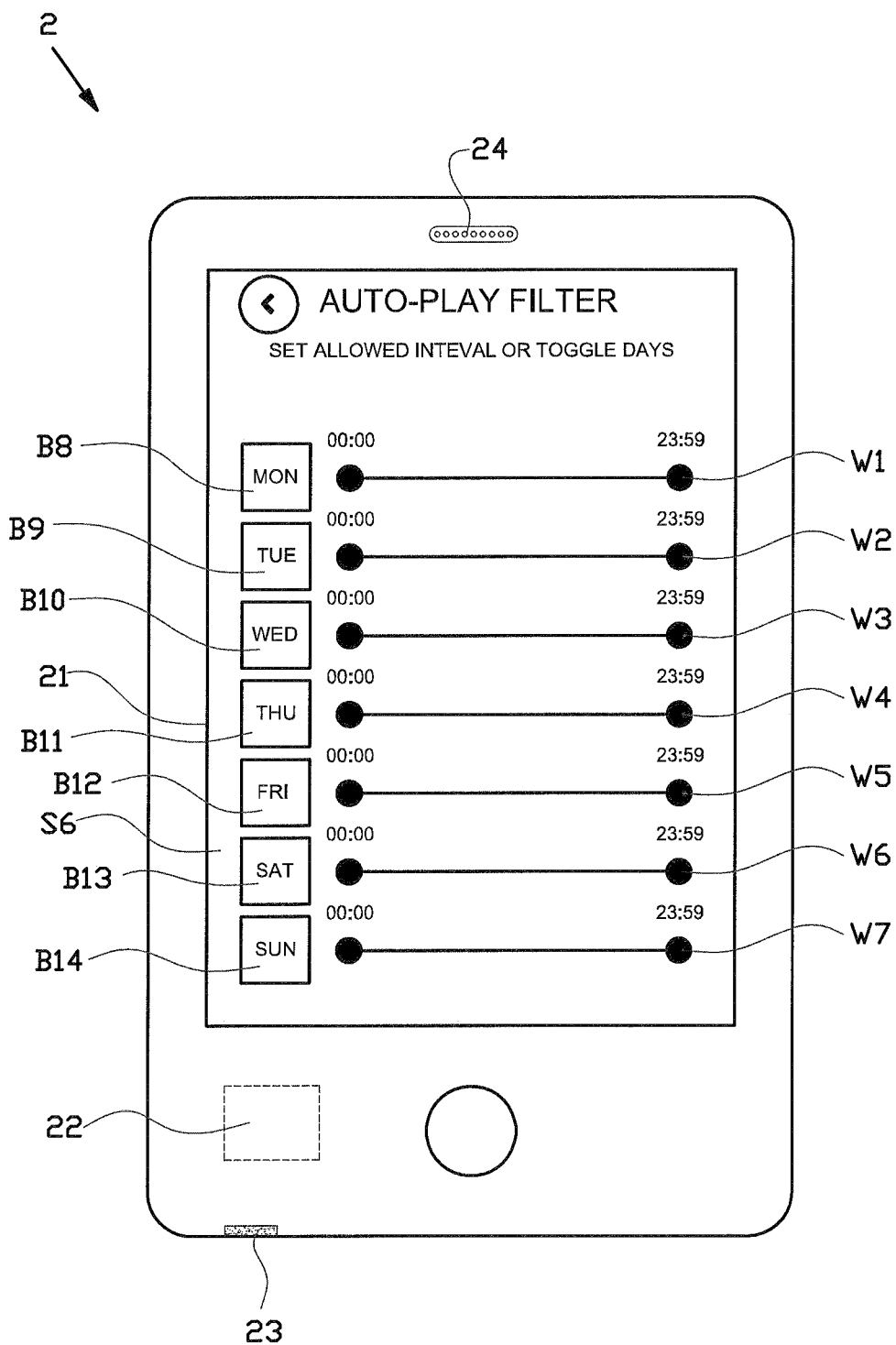
FIG. 8 shows a time window screen of the user interface according to FIG. 4.
Figure 9:
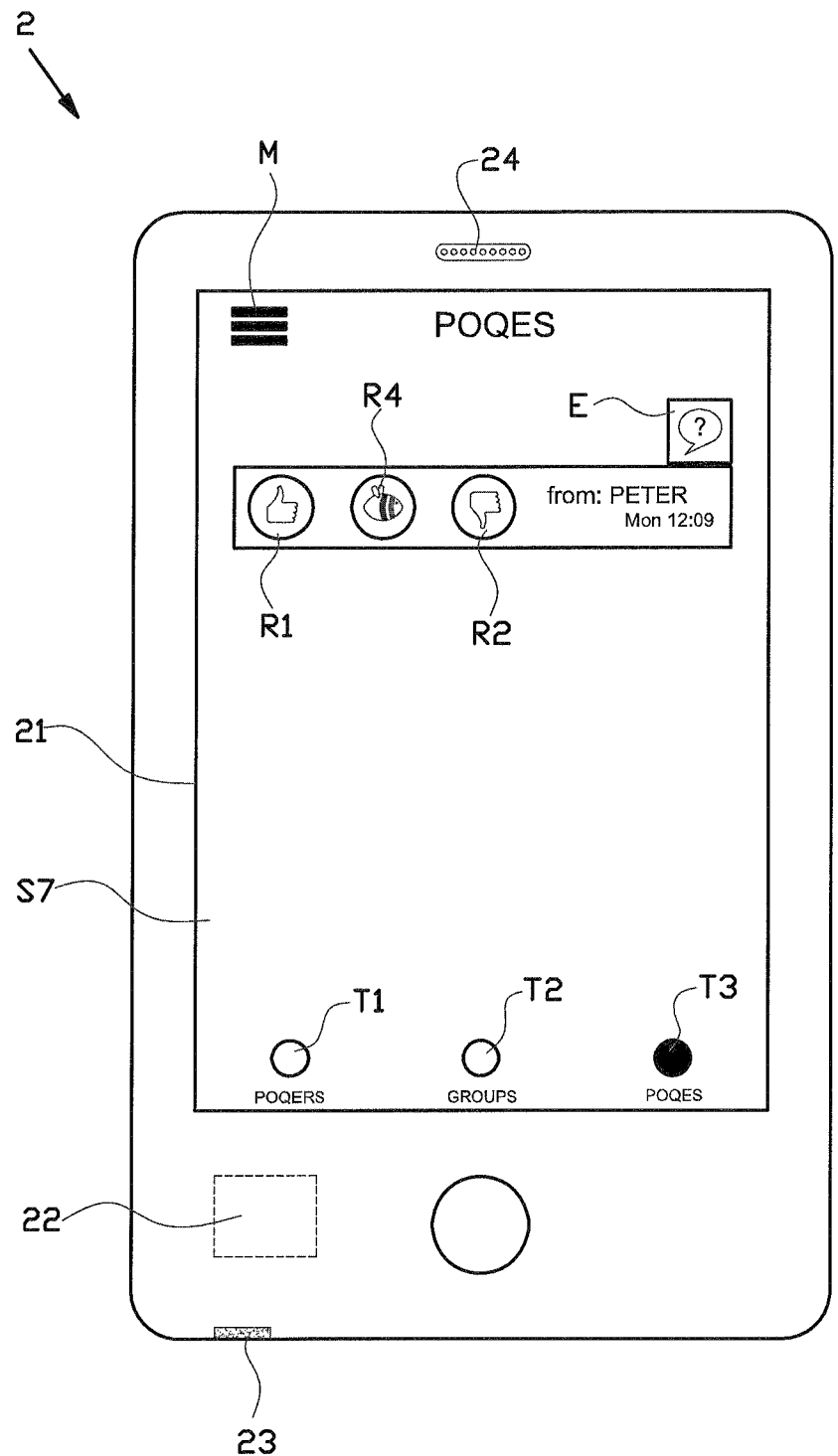
FIG. 9 shows a conversation screen of an alternative user interface displayed on the second electronic device.
Figure 10:
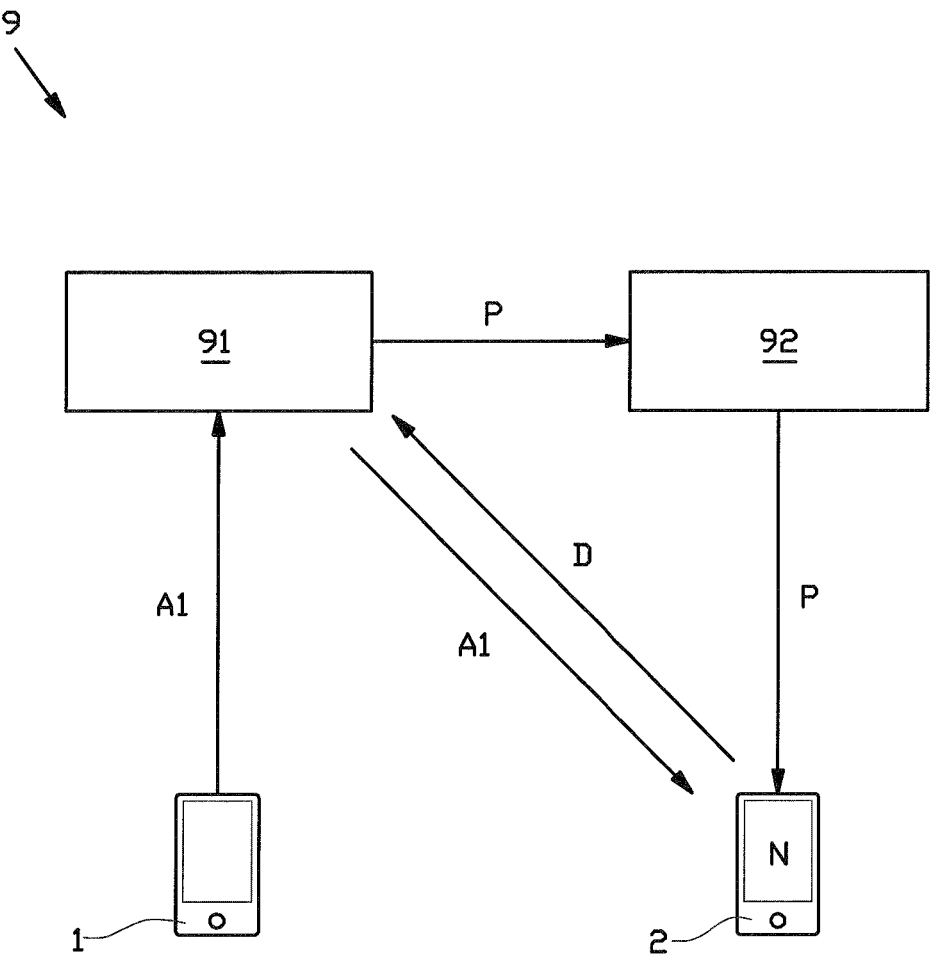
FIG. 10 shows the communication between the first electronic device, the second electronic device and one or more servers to perform a communication method.

FIGS. 1-3 show a first electronic device 1 and FIGS. 4-9 show a second electronic device 2 which form part of a communication system 9 as shown in FIG. 10.

As shown in FIGS. 1-3, the first electronic device 1 comprises a display 11, a processor 12, a microphone 13 and a speaker 14. As shown in FIGS. 4-9, the second electronic device 2 similarly comprises a display 21, a processor 22, a microphone 23 and a speaker 24. In this exemplary embodiment, the microphones 13, 23 and speakers 14, 24 are shown as integral components of the electronic devices 1, 2. Alternatively, the microphones and speakers may be provided separately, e.g. as part of external devices (not shown) that connect to the electronic devices 1, 2 as shown.

Preferably, the first electronic device 1 and the second electronic device 2 are mobile devices, e.g. smart phones or tablets. Alternatively, one or more of the electronic devices 1, 2 may be stationary, e.g. as part of a desktop application (not shown). In this exemplary embodiment, the displays 11, 21 of the electronic devices 1, 2 are touch screens. Alternatively, separate devices such as keyboards or a stylus may be provided to receive user inputs.

As shown in FIG. 10, the communication system 9 further comprises one or more servers, in particular a payload server 91 and a notification server 92, for facilitating the communication between the first electronic device 1 and the second electronic device 2. The electronic devices 1, 2 as shown in FIG. 10 are used to explain the working principle of the present invention. It will however be apparent to one skilled in the art that one or more further electronic devices similar to the electronic devices 1, 2 may be provided to expand the communication system 9. In particular, the communication system 9 is intended to be used on a large scale.

The processors 12, 22 of the first electronic device 1 and the second electronic device 2 are arranged for executing instructions from one or more software applications, computer programs or computer program products. In particular, first electronic device 1 and the second electronic device 2 are each loaded with an operating system, a so-called 'OS', that provides a platform for executing the aforementioned computer program products and for managing the interaction between the computer program products and the hardware of the respective electronic device 1, 2.

The present invention provides a computer program product, a so-called 'app', that is loaded onto the first electronic device 1 and the second electronic device 2 to facilitate communication between the two electronic devices 1, 2. The computer program product may be loaded onto the electronic devices 1, 2 via a data stream, e.g. by downloading it from the internet, or another computer readable medium, e.g. a physical data carrier such as an USB stick. The computer program product comprises a plurality of instructions that, when executed by the processor 12, 22 of a respective one of the electronic devices 1, 2 facilitates communication between the first electronic device 1 and the second electronic device 2. In particular, the processors 12, 22 of the electronic devices 1, 2 are arranged for generating a user interface or a graphic user interface, a so-called 'GUI', having one or more screens S1-S7, as shown in FIGS. 1-3 and FIGS. 5-9, that allow the user to interact with the computer program product and/or the functionality provided by the computer program product. The screens S1-S7 can be generated on each of the electronic devices 1, 2, depending on the functionality required.

When the operating system is a permission based operating system, the computer program product will require access to the microphone 13, 23, the speaker 14, 24. When the electronic device 1, 2 is a communication device that already has a contact list of its own, then the computer program product may also require contact list permission to access the contact list of the electronic device 1, 2.

Figure 4:
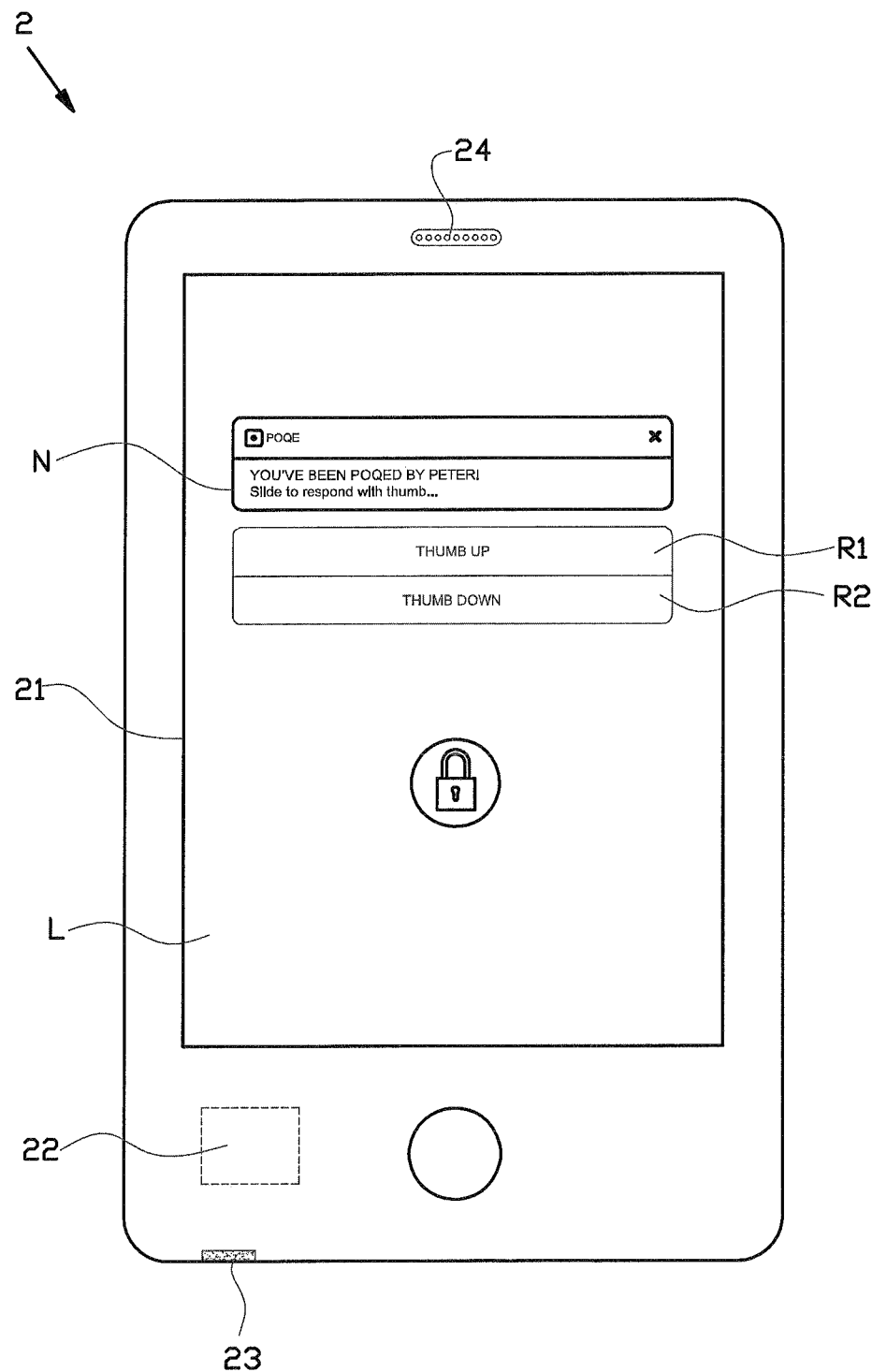
FIG. 4 shows a lock screen displayed on a second electronic device that has received an audio recording from the first electronic device.

In this particular example, the processors 12, 22 are arranged for displaying the user interface in a foreground mode on the display 11, 21, as shown in FIGS. 1-3 and FIGS. 5-9, and for hiding the user interface from the display 11, 21 in a background mode, as shown in FIG. 4.

At least one of the electronic devices 1, 2, in this exemplary embodiment the second electronic device 2, is switchable between an unlocked mode, as shown in FIGS. 5-9, and a locked mode, as shown in FIG. 4. The locked mode has reduced functionality compared to the unlocked mode. In particular, the locked mode requires user interaction to access the unlocked mode. The locked mode typically features a lock screen L, as shown in FIG. 4, showing only limited information, such as time, date and/or weather information. In the locked mode, the lock screen L may also display notifications N from one or more computer program products and play preset sounds to notify the user of new notifications N. The full details of the notification N can only be accessed when the user interacts with the lock screen L to access the unlocked mode, e.g. by inputting a password, a pin code, a gesture or another type of authentication.

The present invention provides a computer-implemented method with steps for communication between the first electronic device 1 and the second electronic device 2. The method may be executed and/or facilitated by the aforementioned computer program product or may in another way be implemented by a computer or the like. The steps of the method will therefore be described independently from the instructions of the computer program product and are purely based on the functionality provided by said computer program product.

The method according to the invention is aimed at providing a voice-based messaging platform for sending short messages, e.g. in the form of open or closed questions, spoken answers, predefined written or graphic responses or a combination thereof. Voice messages are received and played automatically, even when one of the receiving electronic devices 1, 2 is in the locked mode. The voice-based communication thus obtained can be more direct. Moreover, the directness of the automatically played voice messages creates a sense of urgency. To promote short conversations, the duration of the voice messages may optionally be limited, e.g. to less than ten seconds or less than five seconds.

The steps of the computer-implemented method will be elucidated below with reference to FIGS. 1-11.

FIG. 1 shows the situation in which the first electronic device 1 displays a contact screen S1 with a 'CONNECT' button B1 for connecting contacts. From the contact screen S1, the user of the first electronic device can use the 'CONNECT' button B1 to send one or more invites to other users. When the invited user accepts the invitation, a connection is made between the user of the first electronic device 1 and the invited user. The connection allows the users to communicate with each other according to the following steps of the method.

FIG. 2 shows a contact list screen S2 that shows the contacts C1, C2, C3 that have accepted the invitation of the user of the first electronic device 1. In this exemplary embodiments, contacts 'ERICA', 'PETER' and 'RUUD' are added to the contact list displayed on the first electronic device 1. The contact list screen S2 features a record button B2 next to each contact C1, C2, C3 to start recording an audio recording via the microphone 13 of the first electronic device 1. Audio is recorded for as long as the user holds the record button B2. The audio recording is automatically completed when the record button B2 is released. Preferably, the audio recording is then automatically send to the contact C1, C2, C3 associated with the record button B2 that was pressed. Alternatively, the audio recording may be made available for playback, editing and/or approval prior to sending.

The contact list screen S2 further features a time window button B3 next to each contact C1, C2, C3 for setting one or more time windows within which audio recordings from the respective contact are either played automatically or not played automatically. This functionality will be described later in more detail.

FIG. 3 shows a group list screen S3 that shows groups G1, G2 of contacts for which a common audio recording can be made. In this exemplary embodiment, the group 'OFFICE' and the group 'HOME' have been created. The group list screen S3 features a record button B4 that starts and completes a common audio recording in the same way as the individual audio recording that has been described before. However, when the common audio recording has been completed, it will be send to all contacts that are part of the corresponding group G1, G2. The group list screen S3 further features a group edit button B5 next to each group G1, G2 to edit the group composition.

It is noted that the audio recordings are recorded and send only after the audio recording has been completed. Hence, there is no direct, instant or real-time connection between the first electronic device 1 and the second electronic device 2. This allows for the completed audio recordings to be scheduled, in particular when several audio recordings are received at the same electronic device 1, 2 at the same time.

FIG. 4 shows a lock screen S4 displayed by the second electronic device 2 when said second electronic device 2 is in the locked mode. The second electronic device 2 has been loaded with the computer program product, which is running in the background. The lock screen S4 shows a notification N notifying the user of the second electronic device 2 that an audio recording has been received. Simultaneously or shortly thereafter, the audio recording is played automatically, while the second electronic device 2 is still in the locked mode.

FIG. 10 shows the communication between the first electronic device 1, the second electronic device 2 and the servers 91, 92 during the steps of FIGS. 1-4. In particular, it can be observed that a completed first audio recording A1 is transmitted from the first electronic device 1 to the payload server 91, together with identification data identifying the sender and the receiver. The payload server 91 then creates a push message P based on the identification data and sends said push message P to the notification server 92. The notification server 92 receives the push message P from the payload server 91 and pushes the push message P to the second electronic device 2 based on the identification data. The push message P appears as a notification N on the second electronic device 2 and triggers the second electronic device 2 to send a download request D to the payload server and subsequently retrieve or download the completed first audio recording A1 from the payload server 91.

The aforementioned push message P and the completed first audio recording A1 are appropriately encrypted to ensure data security and/or data integrity.

Figure 11:
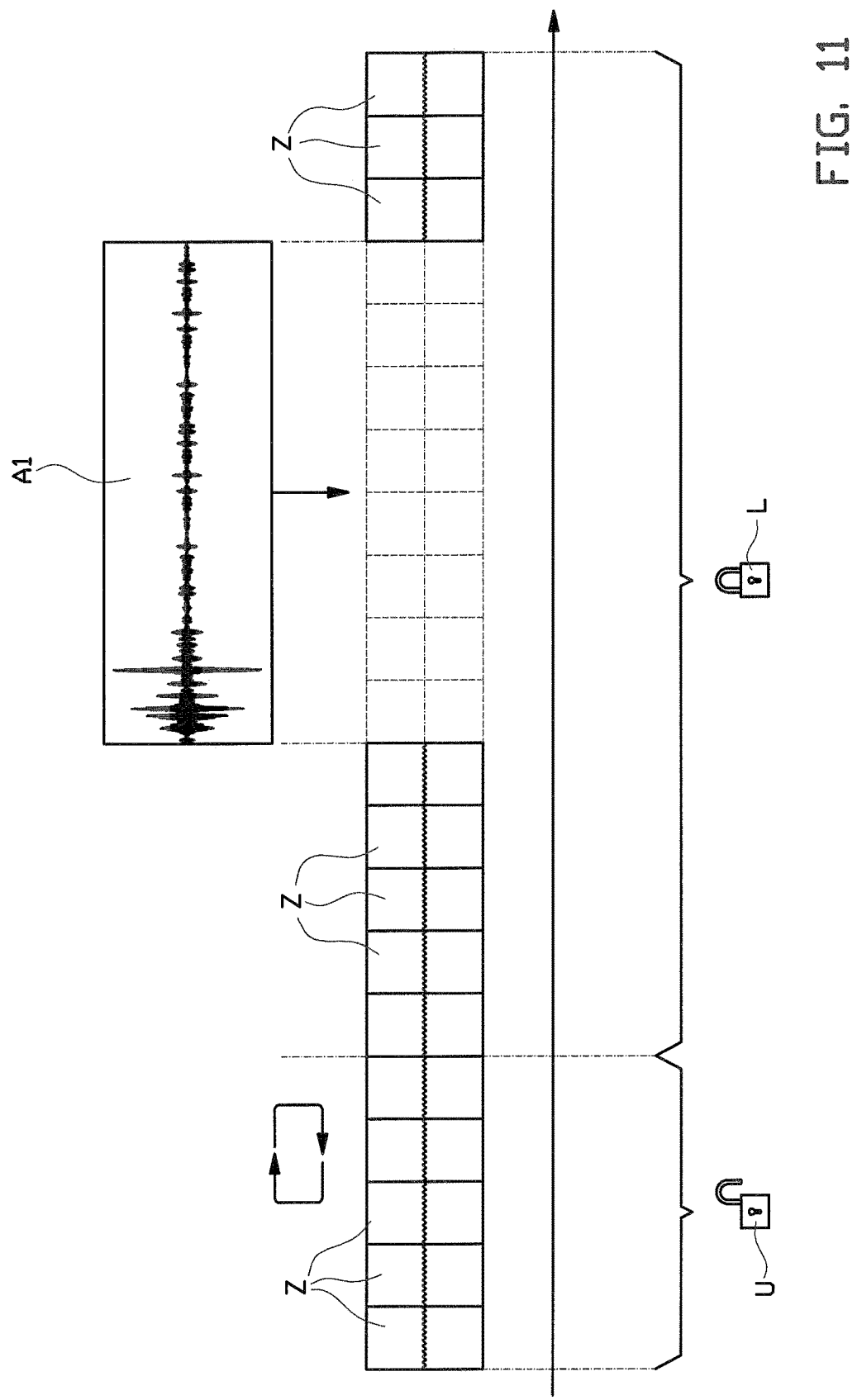
FIG. 11 shows a timeline of audio playback at the second electronic device.

FIG. 11 schematically shows a timeline of audio playback at the second electronic device 2. When the computer program product is loaded on the second electronic device 2 and the instructions thereof are being executed by the processor 22, said instructions cause the second electronic device 2 to play a silent audio sample Z.

Preferably, the silent audio sample Z contains audio with a gain or frequency that is inaudible to the human ears. In this particular example, the silent audio sample Z is relatively short, e.g. only one second, and is continuously looped. If the silent audio sample Z has been started in while the second electronic device 2 was still in the unlocked mode, as indicated with 'U' in FIG. 11, it will continue to play the silent audio sample Z in the locked mode, as indicated with 'L' in FIG. 11. When the completed first audio recording A1 is received by the second electronic device 2, said completed first audio recording A1 is played in addition to or instead of the silent audio sample Z, even when the second electronic device 2 is still in the locked mode.

The same applies to a situation in which the user interface generated by the computer program product is in the background mode. The silent audio sample Z will continue to loop in the background mode and the completed first audio recording A1 will be played in addition to or instead of the silent audio sample Z. It will further be apparent to one skilled in the art that the completed first audio recording A1 can be played automatically when the user interface generated by the computer program product is in the foreground mode on the second electronic device 2, with or without looping the silent audio sample Z.

Hence, it does not matter whether the second electronic device 2 is operating the computer program product in the foreground mode, the background mode or the locked mode; the completed first audio recording A1 will be played automatically upon receipt thereof on the second electronic device 2.

FIG. 4 further shows that the user of the second electronic device 2 has one or more predefined response options R1, R2 to respond to the notification N from the lock screen L. In this particular example, the first response option R1 is a positive response option, e.g. a 'thumbs up', and the second response option R2 is a negative response option, e.g. a 'thumbs down'. Hence, if the completed first audio recording A1 contains a closed question that can be answered by positive or negative response, the user of the second electronic device 2 is able to respond accordingly without unlocking the second electronic device 2 to record its own audio recording.

Alternatively, the user of the second electronic device 2 may decide to unlock the second electronic device 2, in which case the user can access the user interface of the computer program product to have more response options.

Figure 5:
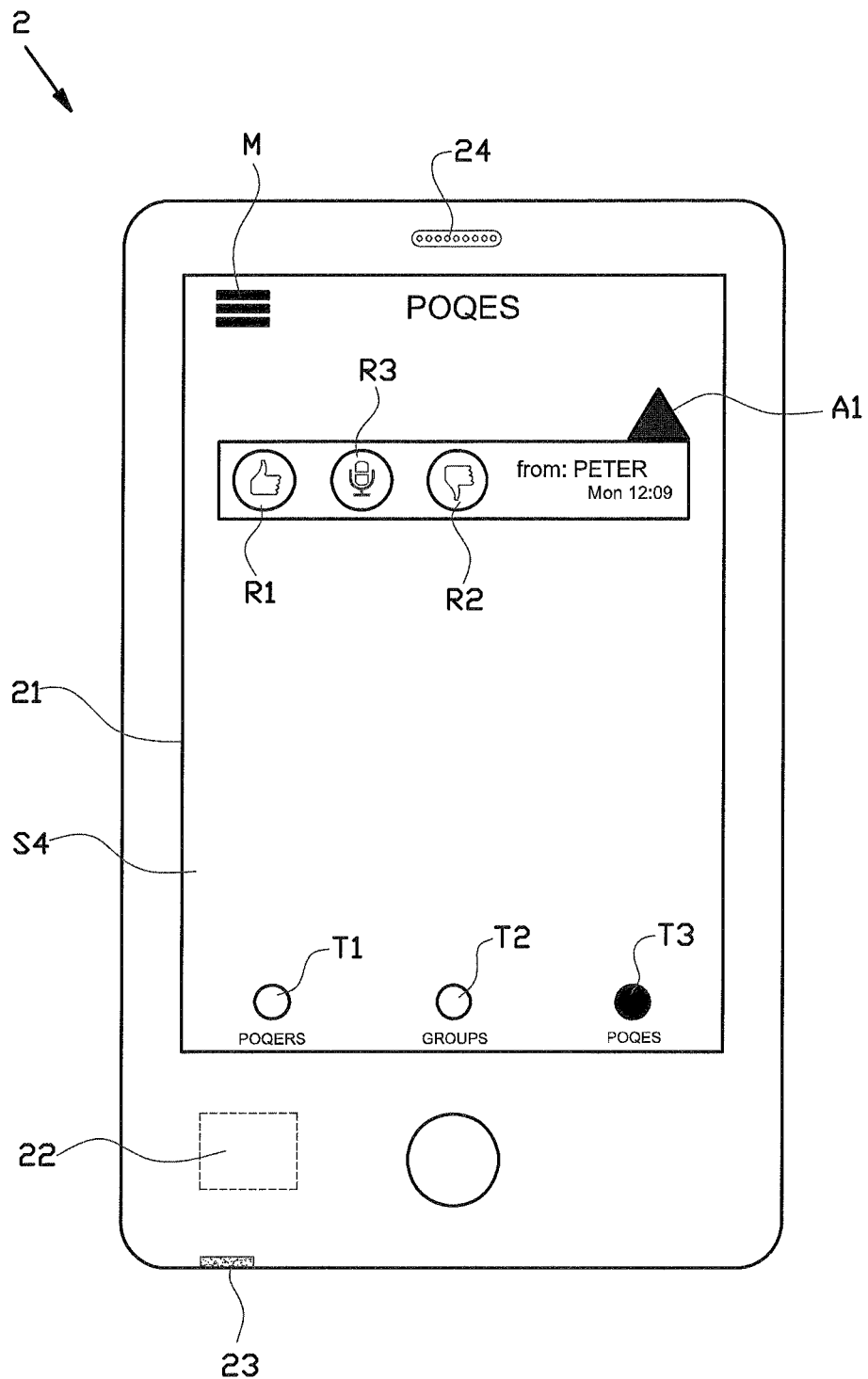
FIG. 5 shows a conversation screen of a user interface displayed on the second electronic device according to FIG. 4 during a first part of a conversation.

FIG. 5 shows a conversation screen S4 displayed on the second electronic device 2 when said device is unlocked and the user interface generated by the computer program product is in the foreground mode. The conversation screen S4 of FIG. 5 shows a first part of a conversation that contains the first audio recording A1 received from the first electronic device 1. In this exemplary embodiment, the completed first audio recording A1 is represented by closed triangle pointing upwards to indicate that it has been received. When the completed first audio recording A1 is first received, it is played automatically. After the initial playback, the user may select or touch the representation of the completed first audio recording A1 again to replay it.

The conversation screen S4 of FIG. 5 features one or more predefined response options R1, R2 and a record option R3 associated with the completed first audio recording A1. The first response option R1 corresponds to the positive response option on the lock screen S of FIG. 4, e.g. a 'thumbs up' and the second response option R2 corresponds to the negative response option on the lock screen of FIG. 4, e.g. a 'thumbs down'. The conversation screen S4 features a third response option R3 which is to record an audio recording in response to the completed first audio recording A1. Said audio recording can be recorded in the same way as the first audio recording A1 and will be transmitted automatically to the user of the first electronic device 1 upon completion.

Figure 6:
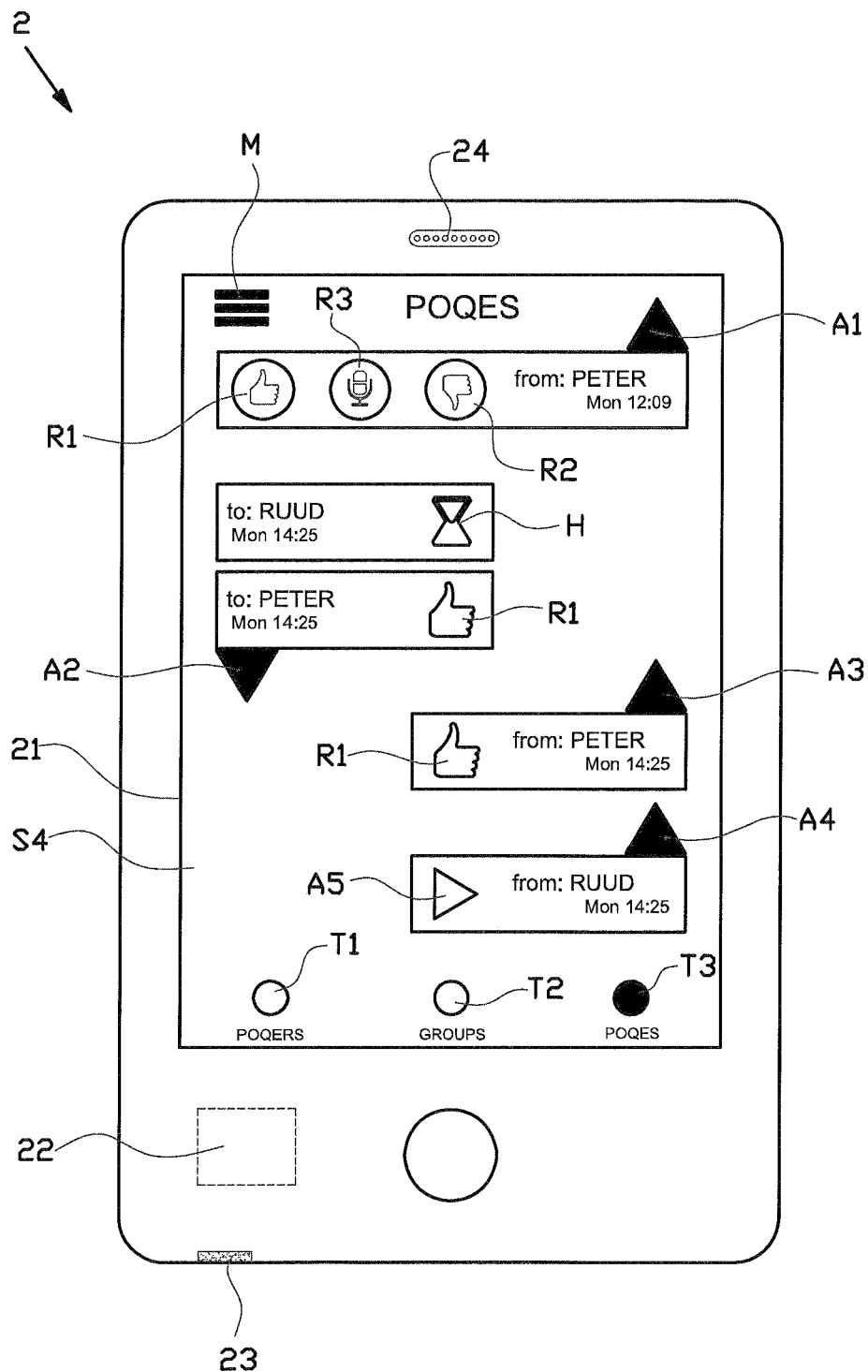
FIG. 6 shows the conversation screen of FIG. 5 during a second part of the conversation.

FIG. 6 shows the same conversation screen S4 as in FIG. 5 as the conversation progresses over time. Note that in this particular example, the conversation screen is not limited to the conversation with the user of the first electronic device 1, but also includes a group communication. Hence, several conversations are represented chronologically in the same conversation screen S4. Alternatively, separate conversation screens may be provided for separate conversations.

As shown in FIG. 6, the completed first audio recording A1 remains unanswered and still features the aforementioned response options R1, R2, R3.

The conversation screen S4 of FIG. 6 further shows a completed second audio recording A2 that has been recorded by the user of the second electronic device 2 and that has been transmitted to a group of contacts, in this case 'RUUD' and 'PETER'. In this particular example, the completed second audio recording A2 is represented by a closed triangle pointing downwards to indicate that it has been sent. The conversation screen S4 automatically adds the contacts associated with the group as a list that is connected to the second audio recording A2 as a container for their respective responses. When no response has been received yet, the absence of the response is represented by an hourglass symbol H. In this case, contact 'RUUD' has yet to respond while contact 'PETER' has responded with response option R1, a 'thumbs up'.

The conversation screen S4 of FIG. 6 further shows a third audio recording A3 and a fourth audio recording A4 that have been received by the second electronic device 2 at substantially the same time from different senders. When receiving multiple audio recordings A2, A3 at the same time, their automatic playbacks could potentially overlap, resulting in a mixed playback of two different audio recordings.

This situation can occur when an initial audio recording, e.g. the first audio recording A1, is send to a group of contacts and two or more contacts respond at substantially the same time. To prevent said overlap, the audio recordings A1, A2, A3 are scheduled or queued such that the audio recordings A1, A2, A3 are not played simultaneously at the second electronic device 2. In particular, the audio recordings A1, A2, A3 are scheduled in a scheduling order based on a start time, a completion time, a transmission time, a receiving time and/or a length of the respective audio recording A1, A2, A3.

In the conversation screen S4 of FIG. 6, the user of the second electronic device 2 has opted to respond to the third audio recording A3 with a predefined 'thumbs up', corresponding to the first response option R1. When the user opts for one of the response options, the other response options disappear. The conversation screen S4 of FIG. 6 shows a third audio recording A3 that has been received from the same sender. In response to the fourth audio recording A4, the user of the second electronic device 2 has opted to send an audio recording of its own. This fifth audio recording A5 is recorded by pressing and holding the third response option R3. As soon as the fifth audio recording A5 is completed, it is transmitted towards the first electronic device 1 and the response options R1, R2, R3 are replaced by the completed fifth audio recording A5, represented open triangle pointing to the right, similar to a 'play' symbol. The user of the second electronic device 2 can play back its own completed fifth audio recording A5 by selecting it.

In the foregoing description, the first electronic device 1 and the second electronic device 2 alternately acts as sender and receiver during specific steps of the method. It will however be apparent to one skilled in the art that each electronic device 1, 2 may also function as sender and receiver simultaneously, e.g. when the user of the second electronic device 2 responds to a previously received audio recording and simultaneously receives a response from the first electronic device 1. When the user is recording and simultaneously receives an incoming audio recording, the automatic playback of the audio recording is delayed until the audio recording has been completed, to prevent the incoming audio recording from interfering with the audio recording that is in progress.

Figure 7:
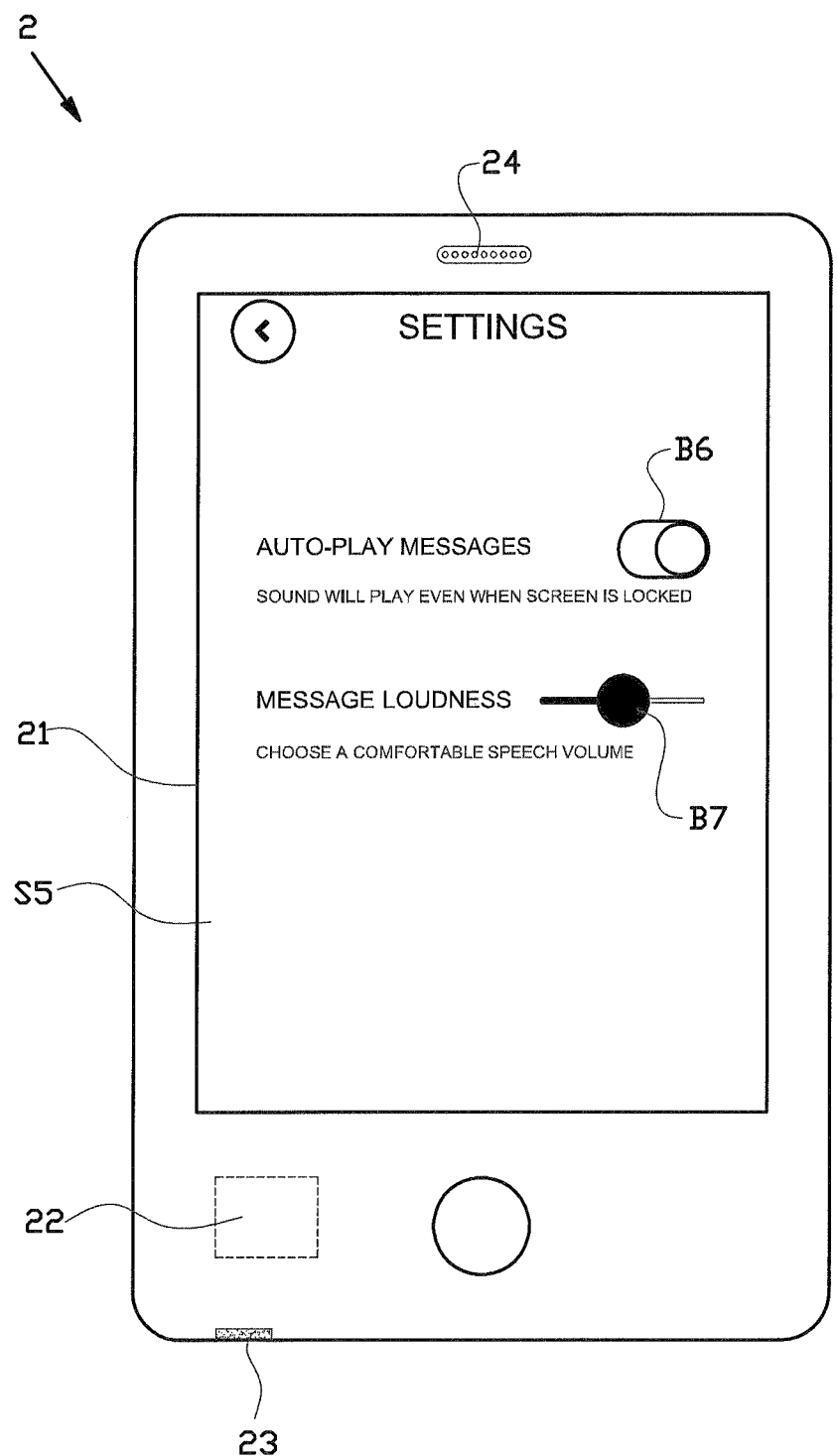
FIG. 7 shows a settings screen of the user interface displayed of the user interface according to FIG. 4.

FIG. 7 shows a settings screen S5 that features a block option B6 to switch the automatic playing of incoming audio recordings 'on' or 'off'. In this particular example, the block option B6 is presented as a toggle switch. When the block option B6 is 'on', the automatic playback of incoming audio recordings is blocked or disabled. Consequently, the incoming audio recordings are not played automatically. The user will merely be notified of newly received audio recordings via a suitable predefined notification.

The settings screen S5 of FIG. 7 further features a message loudness or output volume control B7. In this particular example, the output volume control B7 is presented as a slider. The output volume control B7 controls the perceived loudness of the audio recordings through the speaker 14, 24 of the respective electronic device 1, 2. The output volume control B7 allows for adjusting the output volume within a volume range. The audio recordings are preferably adjusted or enhanced to have substantially the same input gain, i.e. by normalizing the amplitudes after recording to a fixed maximum loudness. Hence, the input gain of a voice recording that includes shouting is decreased while the input gain of a voice recording that includes whispering is increased. The audio recordings may for example be adjusted in accordance with the EBUR128 algorithm, known per se.

The input gain can also be used effectively to keep the output volume the same or substantially the same over the volume range. In particular, the computer program product can be arranged for controlling the input gain of an audio recording in such a way that, when the output volume is at a lower end of the volume range, the input gain is increased and when the output volume is at a high end of the volume range, the input gain is decreased.

FIG. 8 shows a time window screen S6 that features one or more time window controls W1-W7 for setting one or more time windows within which the automatic playback of incoming audio recordings is allowed. Alternatively, the time window controls W1-W7 may control the time windows within which the automatic playback of incoming audio recordings is blocked or disabled. Consequently, the incoming audio recordings will not be played automatically within or outside of the specified time windows and will require user interaction to be played. The time window controls W1-W7 may be provided for the days of the week. Additionally or alternatively, the switches B8-B14 may be provided to toggle the automatic playback 'on' or 'off' for the days of the week. The availability screen S6 may be accessible as a general screen for controlling the time windows for all contacts and groups simultaneously. In this particular embodiment of the invention, the availability screen S6 is configurable on a contact-by-contact basis, accessible through the time window buttons B3 as shown in FIG. 2 next to each contact C1, C2, C3.

FIG. 9 shows a conversation screen S7 of an alternative user interface on the second electronic device 2. The conversation screen S7 features an incoming availability request E and provides a predefined positive response option R1 and a predefined negative response option R2. In this exemplary embodiment, the positive response option R1 is represented by a 'thumbs up' while the negative response option R2 is represented by a 'thumbs down'. The conversation screen S7 comprises an unavailability response option R4 to indicate that the user is 'busy'. In this exemplary embodiment, the unavailability response option R4 is represented by a bee. When a user input is received at the second electronic device 2 opting for the positive response option R1, the negative response option R2 or the unavailability response option R4, a notification indicative of the chosen response option R1, R2, R4 is transmitted from the second electronic device back 2 to the first electronic device 1. The user of the first electronic device 1 can decide, based on the response as received, whether it is appropriate to send an audio recording.

The aforementioned screens S1-S7 of the user interface and the lock screen L can be displayed on the first electronic device 1, the second electronic device 2 and any further electronic devices that are loaded with the computer program product. In any one of the screens S1-S6 as shown in FIGS. 1-3 and 5-9, the user can access the different screens by using the tabs T1, T2, T3 at the bottom. The first tab T1 provides access to the contact list screen S2 of FIG. 2. The second tab T2 provides access to the group list screen S3 of FIG. 3. The third tab T3 provides access to the conversation screens S4, S7 of FIGS. 5, 6 and 9. The settings screen S5 can be accessed via the menu button M.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A computer-implemented method for communication between a first electronic device and a second electronic device, each of the first and second electronic devices having a processor and a non-transitory memory, wherein the method comprises the steps of:
   a) starting and completing a first audio recording at the first electronic device;
   b) transmitting a data file having the completed first audio recording from the first electronic device towards the second electronic device; and
   c) receiving the data file having the completed first audio recording at the second electronic device;
   wherein the second electronic device has an unlocked mode and a locked mode, wherein the locked mode has reduced functionality compared to the unlocked mode and requires user interaction to access the unlocked mode;
   d) playing a silent audio sample on the second electronic device in the unlocked mode, continuing to play the silent audio sample on the second electronic device when the second electronic device enters the locked mode, and
   e) playing the completed first audio recording automatically at the second electronic device instead of or in addition to the silent audio sample in the locked mode when said second electronic device is in the locked mode.

2. The method according to claim 1, wherein the second electronic device comprises a visual display and a computer program product with instructions that, when executed by said processor, generate a graphical user interface displayed on the visual display that allows for user-initiated playback of the completed first audio recording, wherein the processor is arranged for displaying the graphical user interface in a foreground mode on the visual display and for hiding the graphical user interface from the visual display in a background mode, wherein the method further comprises the step of playing the completed first audio recording automatically at the second electronic device when the graphical user interface is hidden from the visual display in the background mode.

3. The method according to claim 2, wherein the method further comprises the step of playing the completed first audio recording automatically at the second electronic device when the graphical user interface is displayed on the visual display in the foreground mode.

4. The method according to claim 1, wherein step b) comprises the steps of transmitting the data file having the completed first audio recording to a payload server and sending a push message to a notification server, wherein step c) comprises the steps of receiving the push message from the notification server and retrieving the data file having the first audio recording from the payload server.

5. The method according to claim 4, wherein the steps of step c) are performed when the second electronic device is in the locked mode.

6. The method according to claim 1, wherein the method further comprises the step of providing a block option at the second electronic device to switch off the automatic playing in step d).

7. The method according to claim 6, wherein the method further comprises the step of providing a notification at the second electronic device that the completed first audio recording has been received.

8. The method according to claim 1, wherein the method further comprises the step of setting one or more time windows at the second electronic device, wherein either inside car outside of the one or more time windows the second electronic device requires user interaction to play the completed first audio recording.

9. The method according to claim 1, wherein the method further comprises the steps of:
   e) providing one or more predefined response options at the second electronic for responding to the completed first audio recording;
   f) receiving a user input at the second electronic device opting for one of the one more response options; and
   g) transmitting a notification indicative of the opted response option from the second electronic device to the first electronic device.

10. The method according to claim 1, wherein the method further comprises the steps of:
    h) transmitting an availability request from the first electronic device towards the second electronic device;
    i) receiving the availability request at the second electronic device;
    j) providing one or more predefined response options at the second electronic device for responding to the availability request;
    k) receiving a user input at the second electronic device opting for one of the one or more response options; and
    l) transmitting a notification indicative of the chosen response option from the second electronic device back to the first electronic device.

11. The method according to claim 10, wherein one of the one or more response options is an unavailability response option indicating that the user of the second electronic device is unavailable or temporarily unavailable.

12. The method according to claim 1, wherein the method further comprises the steps of:
    m) creating a group at the first electronic device comprising the first electronic device, the second electronic device and one or more further electronic devices;
    n) transmitting the completed first audio recording from the first electronic device towards the other electronic devices of the goup; and
    o) receiving the completed first audio recording at the other electronic devices of the group.

13. The method according to claim 12, wherein the method further comprises the step of:
    p) starting and completing a second audio recording at one of the one or more further electronic devices of the group;
    q) transmitting a second data file having the completed second audio recording from the one further electronic device towards the other electronic devices of the group;
    r) receiving the second data file having the completed second audio recording at the second electronic device;
    s) scheduling a playing of the completed first audio recording and the completed second audio recording such that the completed first audio recording and the completed second audio recording are not played simultaneously at the second electronic device.

14. The method according to claim 13, wherein the completed first audio recording and the completed second audio recording are scheduled in a scheduling order based on a start time, a completion time, a transmission time, a receiving time and/or a length of the audio recording.

15. The method according to claim 1, wherein the data file having the completed first audio recording is transmitted automatically after completion of the first audio recording in step b).

16. The method according to claim 1, wherein the completed first audio recording comprises a voice recording.

17. The method according to claim 1, wherein the completed first audio recording has an input gain, wherein the second electronic device has an output volume that is adjustable within a volume range, wherein the method further comprises the steps of increasing the input gain when the output volume of the second electronic device is at a lower end of the volume range and decreasing the input gain when the output volume of the second electronic device is at a high end of the volume range.

18. A communication system comprising:
a first electronic device having a processor and a non-transitory memory;
a second electronic device having a processor and a non-transitory memory, wherein the second electronic device has an unlocked mode and a locked mode, wherein the locked mode has reduced functionality compared to the unlocked mode and requires user interaction to access the unlocked mode, and wherein the processors of the first electronic device and the second electronic device are configured to execute instructions on the first electronic device and said second electronic device, respectively, the instructions comprising:
a) starting and completing a first audio recording at the first electronic device;
b) transmitting a data file having the completed first audio recording from the first electronic device towards the second electronic device; and
c) receiving the data file having the completed first audio recording at the second electronic device;
wherein the second electronic device has an unlocked mode and a locked mode, wherein the locked mode has reduced functionality compared to the unlocked mode and requires user interaction to access the unlocked mode;
d) playing a silent audio sample on the second electronic device in the unlocked mode, continuing to play the silent audio sample on the second electronic device when the second electronic device enters the locked mode, and
e) playing the completed first audio recording automatically at the second electronic device instead of or in addition to the silent audio sample when said second electronic device is in the locked mode.

19. The communication system according to claim 18, wherein the communication system further comprises a notification server and a payload server, wherein the instructions, when executed by the processor of the first electronic device, cause said first electronic device to transmit the data file having the completed first audio recording to the payload server and sending a push message to the notification server, wherein the instructions, when executed by the processor of the second electronic device, cause said second electronic device to receive the push message from the notification server and retrieve the data file having the completed first audio recording from the payload server.

20. A system for coordinating the transfer of audio data files between first and second electronic computing devices, the system comprising:
the first electronic computing device having a processor and a non-transitory memory;
the second electronic computing device having a processor, a non-transitory memory, and at least one audio output device, wherein the second electronic device has an unlocked mode and a locked mode, wherein the locked mode has reduced functionality compared to the unlocked mode and requires user interaction to access the unlocked mode;
a first audio data file stored on a memory of the first electronic computing device, the first audio data file having a first audio recording;
at least one electronic communication network, wherein the first and second electronic computing devices are connectable to one another through the at least one electronic communication network, and wherein the data file having the completed first audio recording is transmitted from the first electronic computing device to the second electronic computing device; and
wherein a silent audio sample is played on the second electronic device in the unlocked mode, wherein the silent audio sample is continuously played on the second electronic device when the second electronic device enters the locked mode, and wherein the first audio data file is automatically executed to play the completed first audio recording at the second electronic device instead of or in addition to the silent audio sample when said second electronic device is in the locked mode.

* * * * *